United States Patent
Engström

(12) 
(10) Patent No.: US 6,176,675 B1
(45) Date of Patent: Jan. 23, 2001

(54) YAWING DEVICE AND WIND POWER PLANT COMPRISING A YAWING DEVICE

(76) Inventor: Staffan Engström, Drottvägen 2, S-181 31 Lidingö (SE)

(*) Notice: Under 35 U.S.C. 154(b), the term of this patent shall be extended for 0 days.

(21) Appl. No.: 09/171,906

(22) PCT Filed: Apr. 25, 1997

(86) PCT No.: PCT/SE97/00710
§ 371 Date: Mar. 19, 1999
§ 102(e) Date: Mar. 19, 1999

(87) PCT Pub. No.: WO97/42409
PCT Pub. Date: Nov. 13, 1997

(30) Foreign Application Priority Data

May 7, 1996 (SE) .................................................. 9601743

(51) Int. Cl.[7] .................................................. F03D 7/02
(52) U.S. Cl. .......................... 415/4.3; 415/2.1; 415/4.5; 415/123; 415/908; 416/9
(58) Field of Search .................. 415/2.1, 4.3, 4.5, 415/123, 908; 416/9, 11, 13, 14, 170 R; 290/44, 55

(56) References Cited

U.S. PATENT DOCUMENTS

| | | | |
|---|---|---|---|
| 4,403,916 | * 9/1983 | Skelsey | 416/14 |
| 4,515,525 | * 5/1985 | Doman | 416/11 |
| 4,571,155 | * 2/1986 | Angeloff | 416/13 |
| 4,692,094 | * 9/1987 | Kulinyak | 416/11 |
| 4,966,525 | * 10/1990 | Nielsen | 416/9 |

FOREIGN PATENT DOCUMENTS 0110807   6/1984   (EP) .

* cited by examiner

Primary Examiner—Edward K. Look
Assistant Examiner—Ninh Nguyen
(74) Attorney, Agent, or Firm—Young & Thompson

(57) ABSTRACT

A damping coupling is provided to reduce the oscillations of the yawing device of a wind power plant. The damping coupling transmits forces from a driving device to a yaw drive, and the damping coupling is arranged and positioned in such a way that the transmitted moment is dependent on the difference in the rotational speeds between the input and the output shafts of the coupling. The damping coupling is preferably a hydrodynamic coupling.

19 Claims, 1 Drawing Sheet

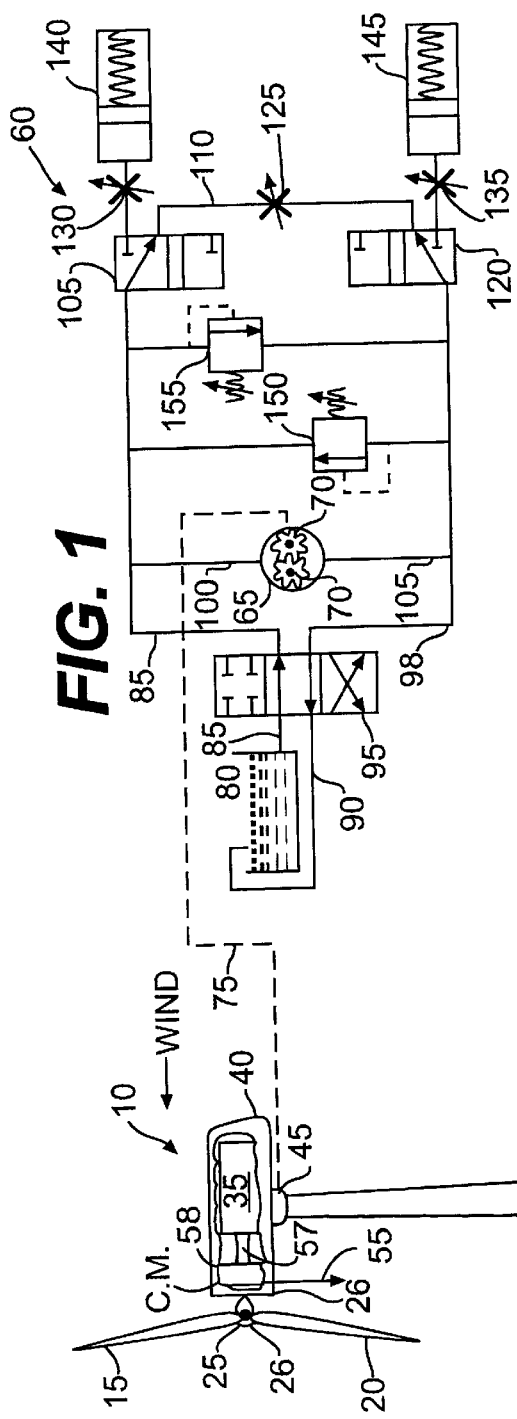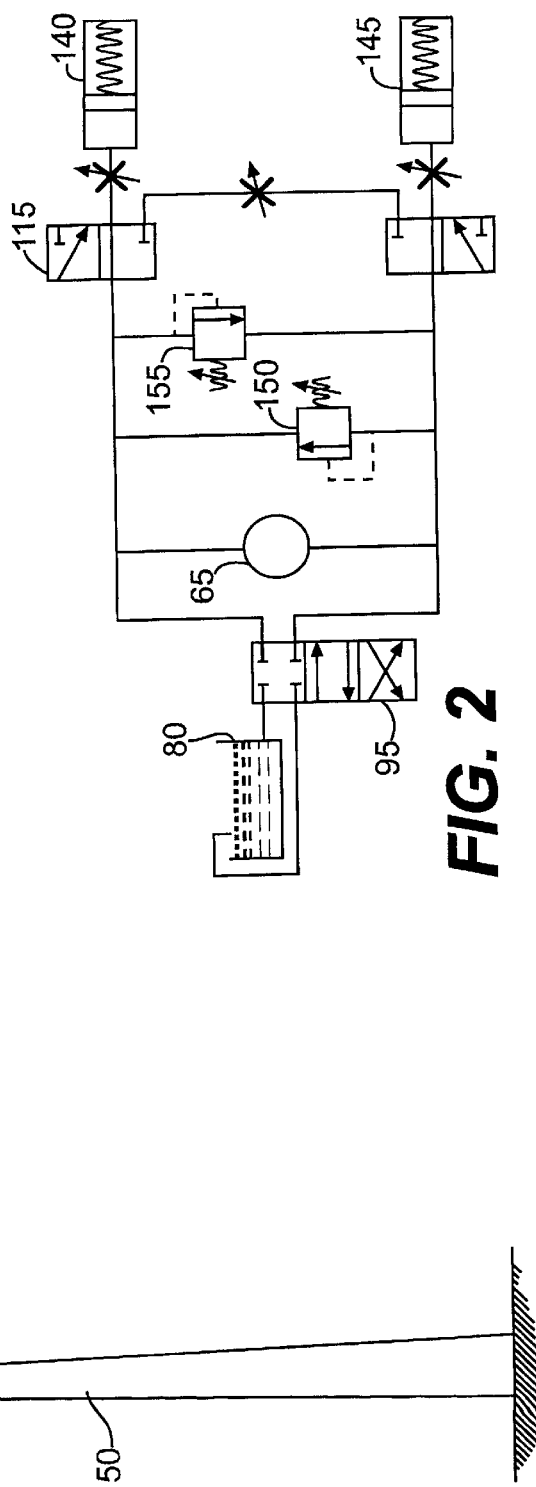

YAWING DEVICE AND WIND POWER PLANT COMPRISING A YAWING DEVICE

TECHNICAL FIELD

The invention relates to a yawing device for a machinery according to the preamble of claim 1. The present invention also relates to a wind power plant equipped with such a yawing device. Besides wind power plants, the term machinery, such as defined in context with the present invention, also includes e.g. hoisting cranes, gun turrets etc. in which a yawing device permits rotation of the machinery. Such a yawing device is known from the European patent application No. 0 110 807 A1.

BACKGROUND

The main objective of a yawing device in a wind power plant with a horizontal wind turbine axis is to position the turbine into the direction of the wind. The prior art yawing device comprises an electrical or hydraulic motor and a high-ratio gear which acts on the toothed path of the yaw bearing and thus turns the machinery into the desired position. Due to the influence of e.g. wind shear the machinery is subjected to pulsating forces, both when yawing and when the machinery is stationary. These forces often have a dominating tendency in one direction, which means that they tend to turn the wind turbine out of the direction of the wind. During yawing, coriolis forces are also added.

These phenomena appear regardless of the number of turbine blades, but are less dominant on turbines with three or more blades. In many cases the machinery has to include strong yaw brakes, which for some designs also have to be partly activated when yawing, in order to avoid the development of damaging oscillations. Such oscillations initially develop in yaw, but coupling with the rest of the machinery may result in oscillations also in the blades and in the tower. Since wind power plants have to be built very slender due to economical reasons, these tendencies are strong. If the machinery is locked to the tower by means of e.g. yaw brakes, the tower will be subjected to large yawing moments, while the tendency to oscillate remains.

Designs with or without yaw brakes may be supplemented with hydraulic dampers, composed of a hydraulic cylinder or a hydraulic pump/motor, the flow of which has to pass through a narrow orifice. The damping components may partly be identical with the hydraulic system that executes the yawing of the wind turbine.

The European patent application No. 0 110 807 A1 discloses a wind power plant where the impact of the damaging oscillations mentioned above are minimised. This is accomplished by installing a drive motor between the turbine of the wind power plant and the yaw bearing. This drive motor is combined with a narrow orifice and thus acts as a damper. However, it is well known in prior art that to achieve the damping effect with this drive motor, other components, such as valves, tanks, filters etc., have to be added.

Even if the mentioned drive motor and its adjoining elements solves the problem with the damping of the damaging oscillations, this solution has a number of drawbacks. This drive motor and its adjoining elements are expensive. It is shows complexity, i.e. installation and maintenance will be expensive and time consuming. Finally the availability will be affected, since the vulnerability of the device will increase with the number of elements added.

SUMMARY OF THE INVENTION

Thus, the object of the present invention is to provide a low-cost yawing device in which not only the forces and the tendency to oscillations are substantially decreased but also the installation and maintenance are simple to carry out.

This object is solved according to the features of the characterising part of claim 1.

Preferred embodiments of the invention are disclosed in the dependant claims 2–9.

DESCRIPTION OF THE DRAWINGS

Different embodiments of the invention will now be described in detail with reference to the accompanying drawings, in which FIG. 1 shows a schematic view of a wind power plant disclosing a yawing device according to the present invention, and FIG. 2 shows a preferred embodiment of the yawing device.

PREFERRED EMBODIMENTS OF THE INVENTION

FIG. 1 shows a schematic view of a wind power plant comprising a wind turbine 2, which drives and is carried by a gear-box 4, an electrical generator 6, a machinery bed 8, said machinery bed being the foundation for the wind turbine 2, the gear 4 and the generator 6. Furthermore, the machinery bed 8 is connected to the yawing device 10 and to the yaw bearing 12, which also is connected to a tower 14. In operation the machinery bed 8 and thus also the wind turbine 2, the gear-box 4 and the generator 6 are able to rotate around a yawing axis A.

FIG. 2 shows a preferred embodiment of the yawing device 10. The yawing device 10 comprises a yaw drive 16 interacting with the yaw bearing 12, optionally a yaw gear-box 18 which is connected to the yaw drive 16 in order to increase the gear-ratio if needed, a connecting shaft 19, optionally an inertial mass 20 in order to further damp the damaging oscillations, and a damping coupling 22, which is provided between the inertial mass 20 and a driving device 24.

The damping coupling 22 transmits the yawing moment. With this coupling, the translated torque for each input rotational speed is a function of the difference in rotational speed between the input and output shafts. The relationship may be linear or may have other characteristics, depending on the design of coupling. The losses and thus the damping in this type of coupling is determined by the difference in rotational speed and by the torque. In a preferred embodiment of the invention this damping coupling is constituted by a hydrodynamic coupling 22. Even if the invention will be described with a hydrodynamic coupling 22, it is obvious to a person skilled in the art that other types of similar couplings can be used, e.g. couplings utilising magnetic fields and induced electrical eddy currents in order to accomplish such a damping.

When yawing, the above mentioned hydrodynamic coupling 22 will affect both the transmission of torque and the damping. When the wind power plant is not yawing, the shaft of the hydrodynamic coupling 22 connected to the driving device 24 is locked. In a preferred embodiment the locking is performed by providing the driving device 24 with a holding brake 26. In this way the machinery will perform small, damped oscillating yaw movements in the horizontal plane, which will decrease the forces acting on the structure as compared to the case in which the machinery is totally locked in yaw. Thus the invention is a simple and efficient solution to the problem of damping the yaw movements both during yawing and when the machinery is not yawing.

In a preferred embodiment the invention also comprises an inertial mass 20, which is connected with the high speed side of the yaw gear 18 and is provided prior to the mentioned hydrodynamic coupling 22, as shown in FIG. 2. Such an inertial mass 20 may be constituted by a separate flywheel or a similar device. It may also be an integral part of e.g. the hydrodynamic coupling 22.

Thus, the inertia of the inertial mass 20 will act on the machinery as a whole by a factor, which is proportional to the gear ratio squared. Since a typical ratio of a yawing device is 8000:1 (input speed for the driving device 24, 1400 r/min, output yawing speed ca 1˙s), the inertial moment of the inertial mass will act round the yawing axis A increased by the factor 8000 squared, which is 64 million. This means that even a small inertial mass of a few kilograms in a substantial way will influence the dynamics of a wind power plant, the machinery of which has a weight of several tens of tons. By substantially is in this context meant that the resulting moment of inertia of the machinery is increased by around 10 percent or more. Generally this influence leads to a decrease of the movements of the machinery, which contributes to prevent the development of dangerous oscillations. An excessive inertial mass is however not appropriate, since a minimisation of the movements may result in large internal forces in the yawing device.

In the preferred embodiment of the invention the yawing device includes both a hydrodynamic coupling 22 and an inertial mass 20 that co-operate in an advantageous way. The damping is determined by the velocity and the inertial forces are determined by the acceleration. Since velocity and acceleration having a sinusoidal movement exhibit a phase shift of 90 degrees, also the damping and the inertial forces will exhibit a phase shift of 90 degrees. Thus the maximum momentary forces/movements for a certain amount of damping work will be less when the inertial mass 20 and the hydrodynamic coupling 22 co-operate compared to when either of the two work independently. The decreased forces allow smaller dimensions of all the components that unite the wind turbine 2 with the tower 14.

The inertia of the machinery, the connecting shaft 19, the inertial mass 20 and the hydrodynamic coupling 22 are all part of forming a dynamic system having a certain torsional natural frequency. The connecting shaft 19 is assumed to exhibit the spring characteristics of all elements that connect the machinery with the inertial mass 20 and the hydrodynamic coupling 22. In a preferred embodiment of the invention the properties of these elements are adapted, arranged and positioned in such a way that the natural frequency is well below the main excitation of the system, caused by the rotation of the wind turbine, since this will minimise the dynamic torques that are transferred through the system.

The driving device 24 of the yawing device is preferably an electric motor that is connected to the hydrodynamic coupling 22 and the device in such a way that it permits rotation at any selected rotational speed. Furthermore, the electric motor 24 may be provided with a holding brake 26 that can lock one side of the hydraulic coupling 22 when the wind power plant is not yawing. In a preferred embodiment of the invention the electric motor is an alternating current (AC) motor 24 which is connected to an electric frequency converter 28 that can be used for controlling the rotational speed of the AC motor under control by a computer or a similar control device.

In a preferred embodiment the half of the hydrodynamic coupling 22, which is normally locked when not yawing, may be rotated at a suitable rotational speed by control of the converter 28 in order to compensate for the inherent tendency of a wind turbine to drift out of the wind direction.

A yawing device according to the present invention is preferably installed in wind power plants that lack yaw brakes, but may also be used in wind power plants that have such brakes.

A wind power plant may possess several yawing devices that work in parallel. By means of the present invention, the yawing moment can be distributed evenly.

Although the present invention primarily has been described in connection with wind power plants, it is obvious to a person skilled in the art that the yawing device also may be used in connection with hoisting cranes, gun turrets or the like where damping and transmission of yawing movements are needed.

It shall be understood that even if the description above shows specific preferred embodiments to illustrate the present invention, a person skilled in the art will readily recognise from this teaching, and from the accompanying drawings and claims that various changes, modifications and variations can be made therein without departing from the spirit and scope of the invention as defined in the following claims.

What is claimed is:

1. A yawing device for a wind power plant, for transmission and damping of yawing movements, comprising a yaw bearing (12) and a yaw drive (16) provided to permit rotation of the wind power in yaw, a driving device (24) for driving the wind power in yaw and a coupling (22) for transmission of the moment from the driving device (24) to the yaw drive (16), characterised in that the coupling (22) is such arranged and positioned that the moment transmitted by it is determined by the difference in rotational speeds of the input and the output shafts of the coupling (22).

2. A yawing device as claimed in claim 1, wherein the coupling is a hydrodynamic coupling (22).

3. A yawing device as claimed in claim 2, wherein an inertial mass (20) is provided in such a way that the resulting inertial moment round the yawing axis (A) is increased.

4. A yawing device as claimed in claim 3, wherein the inertia of the wind power plant, a connecting shaft (19), the inertial mass (20) and the hydrodynamic coupling (22) are adapted, arranged and positioned in such a way that the natural frequency of the system is below the excitation frequency.

5. A yawing device as claimed in claim 2, wherein a brake (26) is provided for braking of the driving device (24).

6. A yawing device as claimed in claim 2, wherein the driving device (24) is provided to admit rotation at selected rotational speeds.

7. A yawing device as claimed in claim 2, wherein the driving device is an AC motor (24) that may be controlled by a frequency converter (28).

8. A yawing device as claimed in claim 1, wherein an inertial mass (20) is provided in such a way that the resulting inertial moment round the yawing axis (A) is increased.

9. A yawing device as claimed in claim 8, wherein the inertia of the wind power plant, a connecting shaft (19), the inertial mass (20) and the hydrodynamic coupling (22) are adapted, arranged and positioned in such a way that the natural frequency of the system is below the excitation frequency.

10. A yawing device as claimed in claim 9, wherein the inertial mass (20) is provided on the high speed side of a yaw gear (18) which is connected to the yaw drive (16).

11. A yawing device as claimed in claim 9, wherein the inertial mass (20) is an integral part of the coupling (22).

12. A yawing device as claimed in claim 8, wherein the inertial mass (20) is provided on the high speed side of a yaw gear (18) which is connected to the yaw drive (16).

13. A yawing device as claimed in claim 8, wherein the inertial mass (20) is an integral part of the coupling (22).

14. A yawing device as claimed in claim 8, wherein a brake (26) is provided for braking of the driving device (24).

15. A yawing device as claimed in claim 8, wherein the driving device (24) is provided to admit rotation at selected rotational speeds.

16. A yawing device as claimed in claim 8, wherein the driving device is an AC motor (24) that may be controlled by a frequency converter (28).

17. A yawing device as claimed in claim 1, wherein a brake (26) is provided for braking of the driving device (24).

18. A yawing device as claimed in claim 1, wherein the driving device (24) is provided to admit rotation at selected rotational speeds.

19. A yawing device as claimed in claim 18, wherein the driving device is an AC motor (24) that may be controlled by a frequency converter (28).

\* \* \* \* \*

UNITED STATES PATENT AND TRADEMARK OFFICE
CERTIFICATE OF CORRECTION

PATENT NO. : 6,176,675 B1
DATED : January 23, 2001
INVENTOR(S) : Staffan Engström It is certified that error appears in the above-identified patent and that said Letters Patent is hereby corrected as shown below:

The title page, showing the illustrative figure, should be deleted and substitute therefore the attached title page.

(12) United States Patent
Engström

(10) Patent No.: US 6,176,675 B1
(45) Date of Patent: Jan. 23, 2001

(54) YAWING DEVICE AND WIND POWER PLANT COMPRISING A YAWING DEVICE

(76) Inventor: Staffan Engström, Drottvägen 2, S-181 31 Lidingö (SE)

(*) Notice: Under 35 U.S.C. 154(b), the term of this patent shall be extended for 0 days.

(21) Appl. No.: 09/171,906

(22) PCT Filed: Apr. 25, 1997

(86) PCT No.: PCT/SE97/00710

§ 371 Date: Mar. 19, 1999

§ 102(e) Date: Mar. 19, 1999

(87) PCT Pub. No.: WO97/42409

PCT Pub. Date: Nov. 13, 1997

(30) Foreign Application Priority Data

May 7, 1996 (SE) .................................... 9601743

(51) Int. Cl.⁷ ........................................... F03D 7/02
(52) U.S. Cl. ................ 415/4.3; 415/2.1; 415/4.5; 415/123; 415/908; 416/9
(58) Field of Search ............... 415/2.1, 4.3, 4.5, 415/123, 908; 416/9, 11, 13, 14, 170 R; 290/44, 55

(56) References Cited

U.S. PATENT DOCUMENTS

| | | | |
|---|---|---|---|
| 4,403,916 | * 9/1983 | Skelsey | 416/14 |
| 4,515,525 | * 5/1985 | Doman | 416/11 |
| 4,571,155 | * 2/1986 | Angeloff | 416/13 |
| 4,692,094 | * 9/1987 | Kulinyak | 416/11 |
| 4,966,525 | * 10/1990 | Nielsen | 416/9 |

FOREIGN PATENT DOCUMENTS 0110807   6/1984   (EP)

\* cited by examiner

*Primary Examiner*—Edward K. Look
*Assistant Examiner*—Ninh Nguyen
(74) *Attorney, Agent, or Firm*—Young & Thompson

(57) ABSTRACT

A damping coupling is provided to reduce the oscillations of the yawing device of a wind power plant. The damping coupling transmits forces from a driving device to a yaw drive, and the damping coupling is arranged and positioned in such a way that the transmitted moment is dependent on the difference in the rotational speeds between the input and the output shafts of the coupling. The damping coupling is preferably a hydrodynamic coupling.

19 Claims, 1 Drawing Sheet

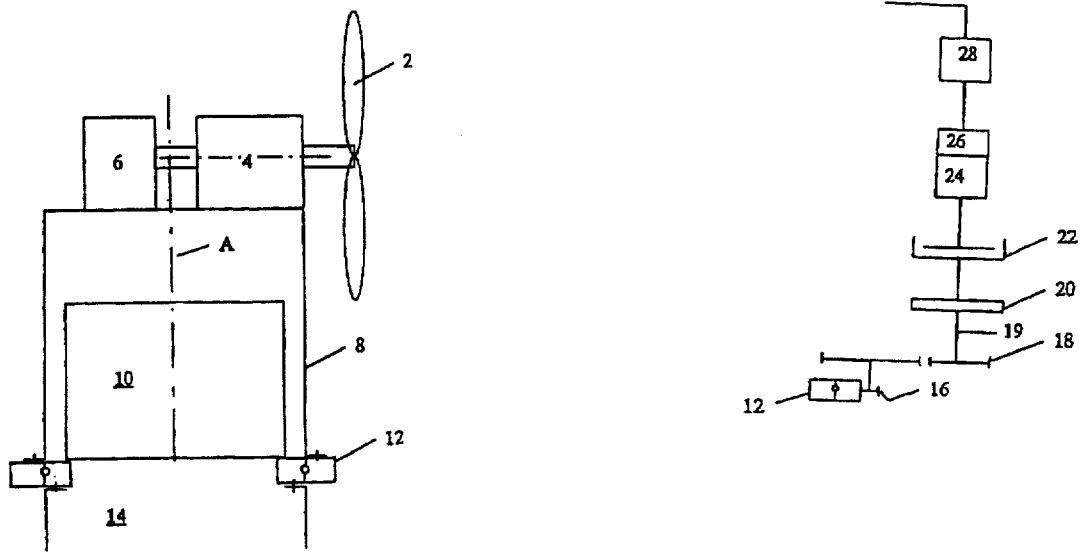

UNITED STATES PATENT AND TRADEMARK OFFICE
CERTIFICATE OF CORRECTION

| | |
|---|---|
| PATENT NO. : 6,176,675 B1 | Page 3 of 3 |
| DATED : January 23, 2001 | |
| INVENTOR(S) : Staffan Engström | |

It is certified that error appears in the above-identified patent and that said Letters Patent is hereby corrected as shown below:

Replace the single sheet of drawings with the following two figures of drawings:

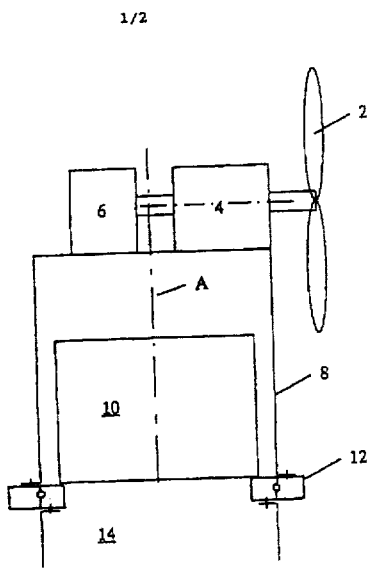

FIG. 1

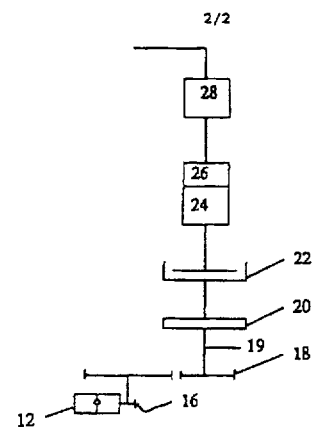

FIG. 2

Signed and Sealed this

Twenty-third Day of October, 2001

Attest:

NICHOLAS P. GODICI
Attesting Officer    Acting Director of the United States Patent and Trademark Office